Oct. 31, 1950     R. D. LITSTER     2,527,508
PNEUMATIC PECK AND PANEL HAMMER
Filed July 18, 1947     4 Sheets-Sheet 1
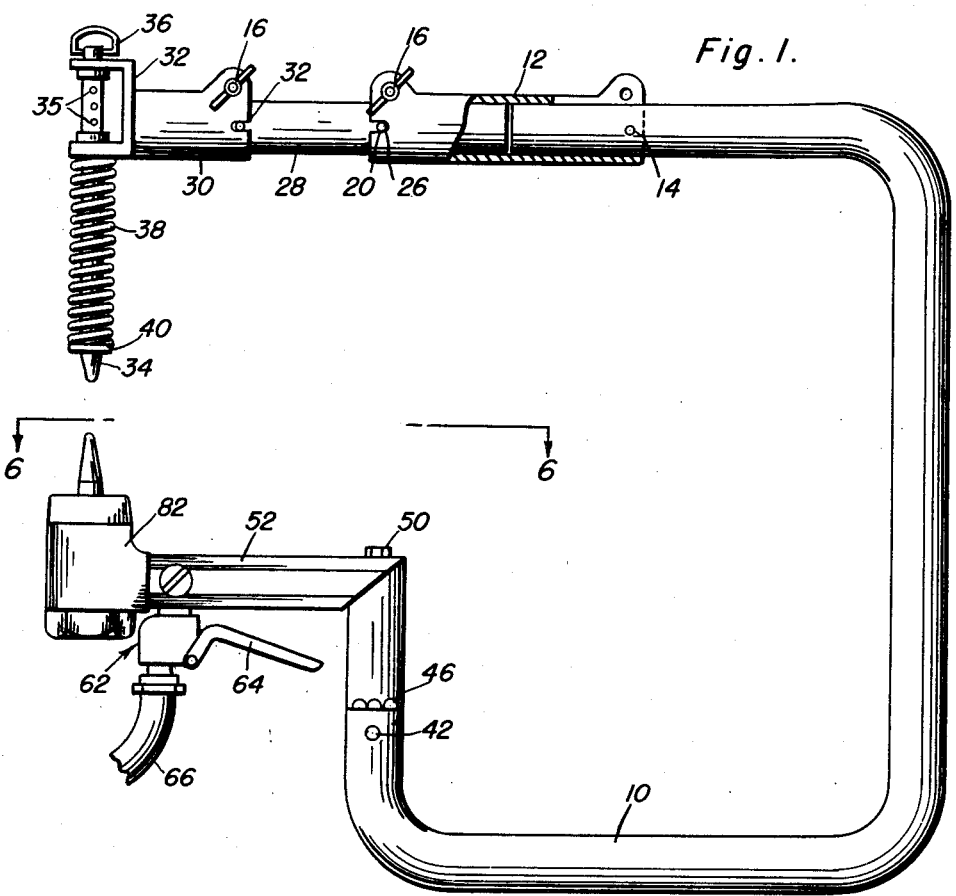
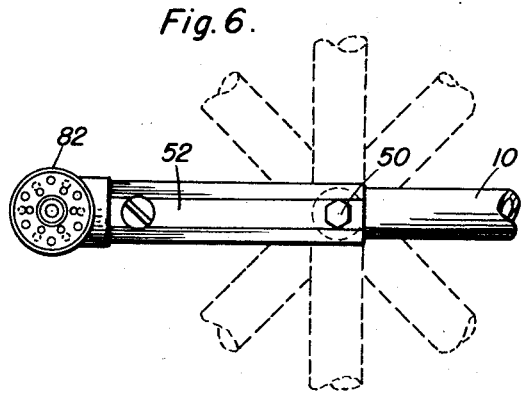
Inventor
Robert D. Litster
By *Clarence A. O'Brien and Harvey B. Jacobson*
Attorneys Oct. 31, 1950  R. D. LITSTER  2,527,508
PNEUMATIC PECK AND PANEL HAMMER
Filed July 18, 1947  4 Sheets-Sheet 2
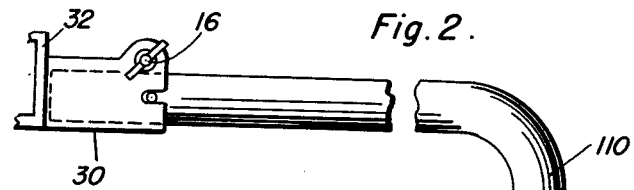
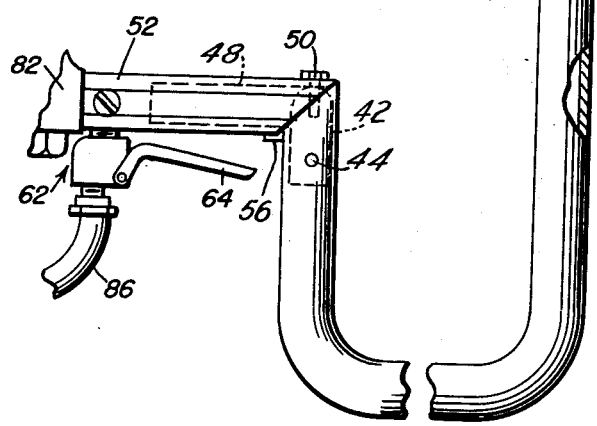
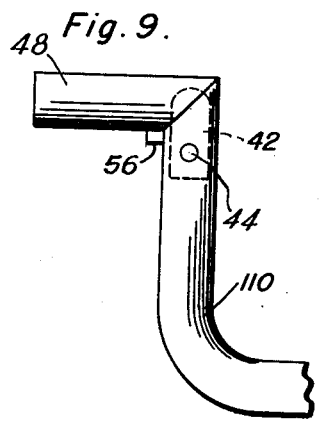
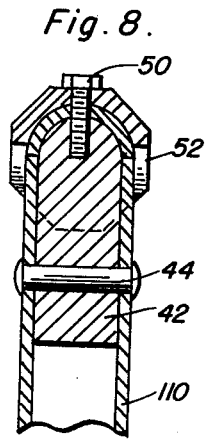
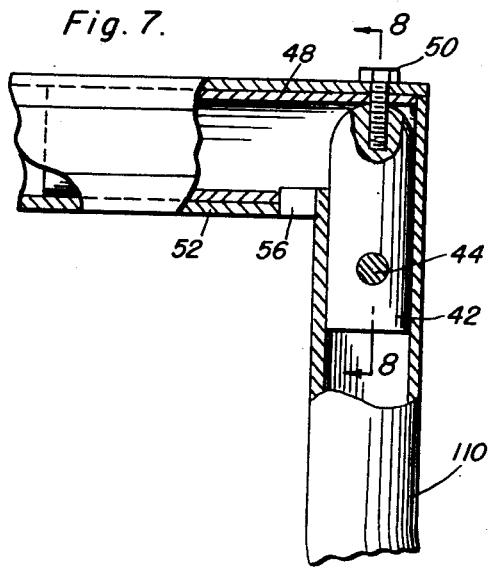
Inventor
Robert D. Litster
By *Clarence A. O'Brien and Harvey B. Jacobson*
Attorneys Oct. 31, 1950
R. D. LITSTER
2,527,508
PNEUMATIC PECK AND PANEL HAMMER
Filed July 18, 1947
4 Sheets-Sheet 3
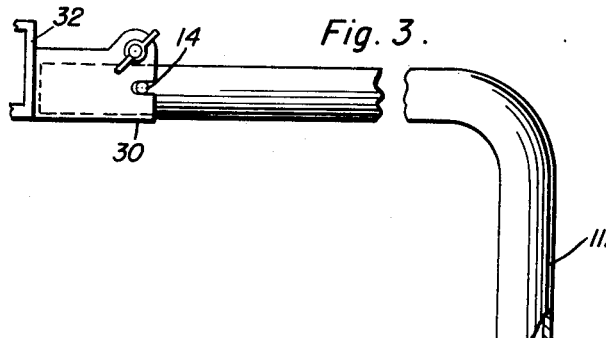
Fig. 3.
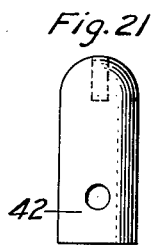
Fig. 21.
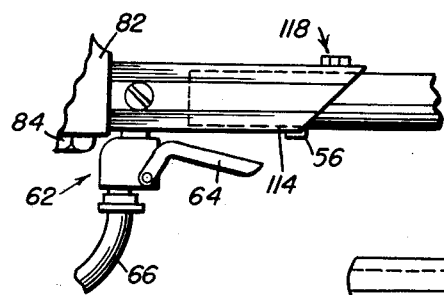
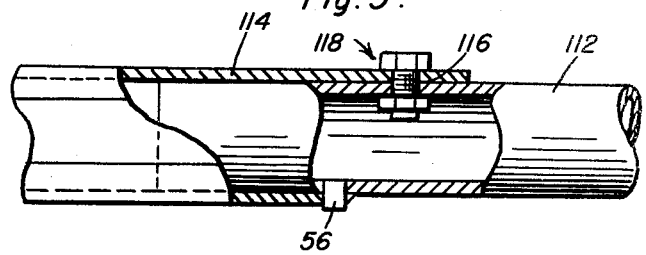
Fig. 5.
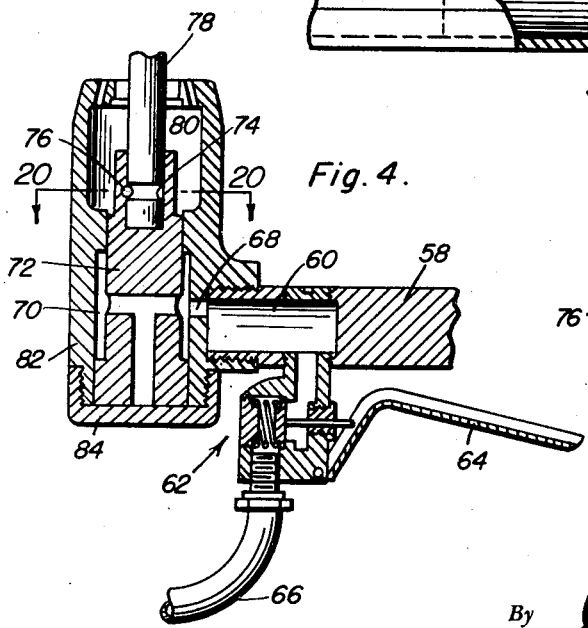
Fig. 4.
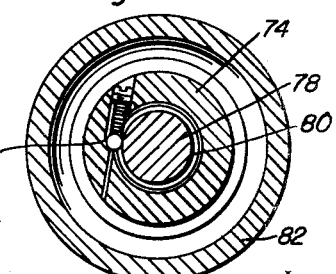
Fig. 20.
Inventor
Robert D. Litster
By Clarence A. O'Brien
and Harvey B. Jacobson
Attorneys Oct. 31, 1950 — R. D. LITSTER — 2,527,508
PNEUMATIC PECK AND PANEL HAMMER
Filed July 18, 1947 — 4 Sheets-Sheet 4
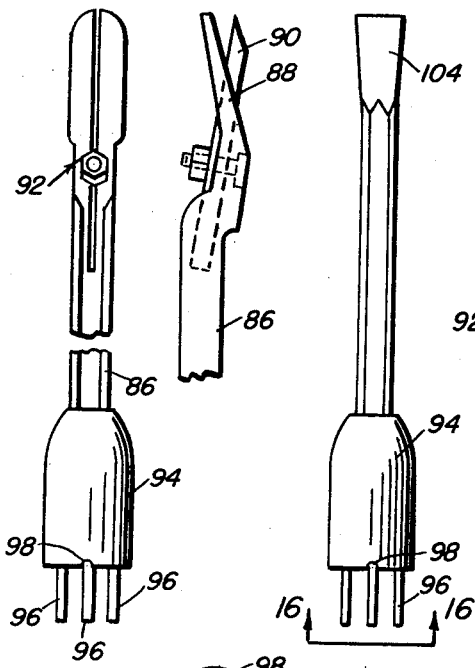
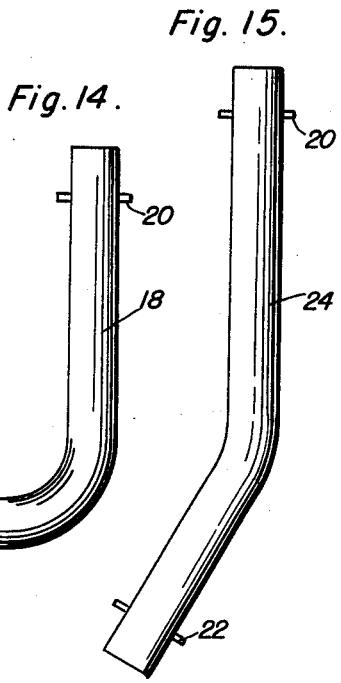
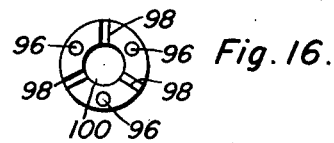
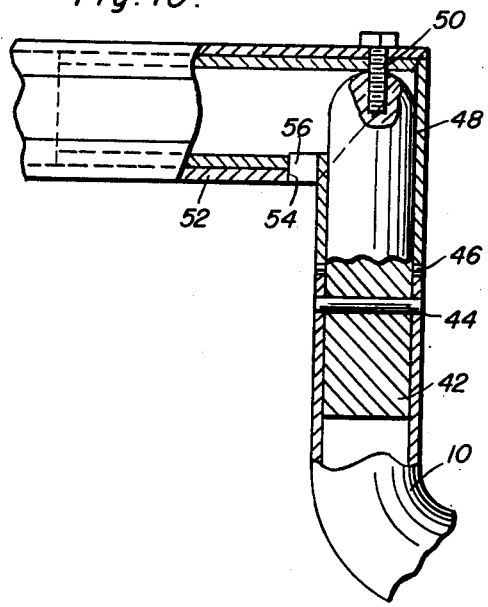
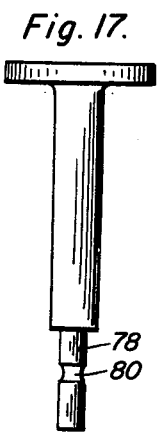
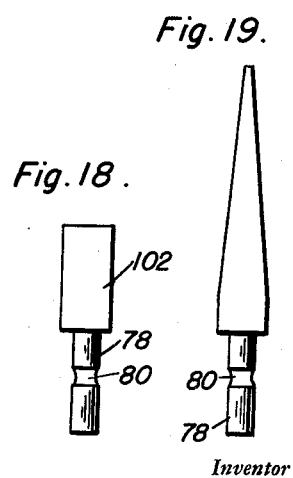
Inventor
Robert D. Litster
By Clarence A. O'Brien and Harvey B. Jacobson
Attorneys Patented Oct. 31, 1950

2,527,508

UNITED STATES PATENT OFFICE 2,527,508

PNEUMATIC PECK AND PANEL HAMMER

Robert D. Litster, Sparks, Nev.

Application July 18, 1947, Serial No. 761,811

3 Claims. (Cl. 153—32)

This invention appertains to novel and useful improvements in metal working tools particularly useful in straightening or otherwise treating vehicle bodies and pertinent parts associated therewith.

An object of this invention is to apply forces in predetermined areas of vehicle bodies in an improved manner.

Another object of this invention is to provide means on a yoke for detachably and adjustably securing a dolly adjacent a fluid actuated hammer.

Another purpose of this invention is to provide means adjustably secured to the said yoke for reciprocably retaining and actuating a hammer.

Another purpose of this invention is to provide means for selectively controlling the actuation of said hammer retaining means.

A further object of this invention is to provide improved dollies and hammers for use in conjunction with the said yoke.

Another purpose of this invention is to provide means for preventing relative rotation of said extension means and said yoke.

A further purpose of this invention is to provide an improved, inexpensive and simplified tool of the nature to be described which is adaptable to many environments and which provides simply access to certain restricted areas common to most automotive vehicle bodies.

Ancillary objects and features of novelty shall become apparent in following the description of the preferred embodiments of the present invention, illustrated in the accompanying drawings, wherein:

Figure 1 is an elevational side view of one form of the invention;

Figure 2 is an elevational side view of another embodiment;

Figure 3 is an elevational view of a further embodiment of this invention;

Figure 4 is a sectional view of the fluid hammer actuation means and retaining means utilized in conjunction with and forming part of the present invention;

Figure 5 is an elevational view of a detail of construction, portions being broken away in section to further illustrate details;

Figure 6 is a plan view of a selected portion of the present invention, taken on the line 6—6 of Figure 1 and in the direction of the arrows;

Figure 7 is an elevational view with portions shown in section, illustrating a detail of construction;

Figure 8 is a longitudinal sectional view of the details shown in Figure 7 and taken substantially on the line 8—8 thereof and in the direction of the arrows;

Figure 9 is an elevational view showing a bend utilized in conjunction with the invention;

Figure 10 is a further sectional detail of construction showing particularly a selected portion of the hammer retaining means;

Figures 11, 12 and 21 are views of a selected tool utilized in conjunction with any of the illustrated embodiments of the invention, Figure 21 illustrating the preferred bolts utilized for retaining the extensions in Figures 11 and 12 in the operative position;

Figure 13 is an elevational view of another tool selectively operable in the present invention;

Figure 14 and Figure 15 illustrate extension means for use in detachably retaining the dolly to the said yoke;

Figure 16 is an end view of the invention disclosed in Figure 13 and taken substantially on the line 16—16 thereof and in the direction of the arrows;

Figure 17 as well as Figures 18 and 19 illustrate further tools utilized in each of the illustrated embodiments of the present invention;

Figure 20 is a transverse sectional view of the detail of construction shown in Figure 4 and taken substantially on the line 20—20 thereof and in the direction of the arrows, and Figure 21 is an elevational view of a lug which forms a part of the invention.

Referring now in detail to the illustrated preferred embodiments of the present invention, like reference characters are used throughout to indicate similar elements.

This invention relates primarily to metal working tools adaptable for use in conjunction with straightening or otherwise adjusting automotive vehicle bodies and other elements pertinent to vehicle bodies. As is well known in the art, there are certain relatively restricted areas in which to labor in certain modern vehicles. It is within the purview of this invention to provide a device which is easily and dextrously operative in these restricted areas. Consequently, time, effort and cost of repair is reduced in employing this invention. Also, utility of the invention renders a metal man's employment more appealing and relatively easy, eliminating much guessing.

In order to render the invention commercially feasible, it has been one of the prime purposes to provide a mechanically simple device which is extremely versatile, capable of performing many varied functions and adjustments. The illustrated embodiments of the invention are made in accordance with common shop practices and principles and utilize only conventional materials, known in the art.

Taking the embodiment of the invention disclosed in Figure 1, there is disclosed a yoke 10 composed of any suitable material, preferably tubing or other metallic equivalents. It is noted from an inspection of Figure 1 that the said yoke may be defined as substantially rectangular, having a selected portion of the rectangle removed. By experimentation and common use in the art, it has been found that this selected configuration is preferable.

At one terminal portion of the said yoke there is provided dolly retaining means while at the other end of the said yoke 10 there is supplied means for retaining and actuating a hammer. The dolly retaining means is preferably composed of a sleeve 12 received over the said yoke and pinned at 14 thereto. Ears may be provided on the said sleeve 12 and friction clamping means 16 provided therethrough. Extension means are received in the said sleeve 12 and retained therein. Going to Figures 14 and 15, there is disclosed only two of the extension means utilized in conjunction with this portion of the invention. In Figure 14 there is a right angular extension 18 having pins 20 and 22, respectively, extending therethrough adjacent the terminal portions thereof. In Figure 15 there is disclosed another angularly bent extension 24 also having pins 20 and 22, respectively extending therethrough adjacent the ends thereof. It will be noted that a slot 26 is provided in the said sleeve 12 for the purpose of receiving the pins 20 therein. The said extension means 18, 24 and 28 are selectively and detachably engageable within the sleeve 12. It will be noted further that the pins 20 prevent relative rotation of the extension means and the yoke 10.

Positioned on the end of the said extension means is another sleeve 30 having aligned slots 32 therein. The pins 22 are adapted to engage the confines of the said slots 32 thereby further preventing relative rotation of the sleeve 30 and the extension 28. Ears are also provided on the last mentioned sleeve 30 and friction clamping means 16 is utilized therewith for the obvious securing purposes.

A bracket 32 is secured to the end of the said sleeve 30 and aligned apertures (unnumbered) extend therethrough. A quick change mechanism is supplied for the purpose of retaining the dolly 34 in the said bracket 32. A conventional protuberance-aperture system may be employed at this point with an actuating handle or ring 36 extending above the bracket 32. Of course, a spring 38 is employed for biasing the member 34 toward the fluid actuated hammer, to be described later. The said spring 38 may seat on a suitable collar 40 as seen in Figure 1.

It is manifest from an inspection of Figures 1, 14 and 15 that selective extensions may be employed for the purpose of projecting the dolly in different angular positions, relative to the plane of the yoke 10.

Going now to the hammer retaining and actuation means, reference is made first to Figure 10 wherein there is disclosed a portion of the yoke 10 having a lug 42 riveted thereto. The long rivet 44 may be substituted by any conventional securing means such as a pin, welding, bolts or the like. The terminal portion of the said yoke 10 is provided with a plurality of rises which taken collectively, may be considered serrations. The said serrations are disclosed at 46 of Figure 10 wherein it will be noted that a right angular extension 48 also has serrations at one selected end thereof. The said right angular extension 48 engages the upper rounded end of lug 42 and is retained thereon by utility of a bolt 50, protruding through the extension 48 and terminating in the lug 42. A sleeve 52 extends from the said extension 48 and is provided with a slot 54 engageable with a lug 56. Now, this lug protrudes from the said right angular extension 48 and thereby retains the sleeve 52 and extension 48 in relatively immovable fixed position. Going now to Figure 6 it will be noted that the sleeve 52 may be adjusted pivotally about the axis of the bolt 50 by simply loosening the said bolt and turning the extension 48 about the lug 42 as an axis. Upon locking of the said bolt 50 in the aperture in the said extension 42, the serrations will be matched thereby retaining the sleeve 52 in a selected, adjusted pivoted position.

Going now to Figure 4, it is seen that the sleeve-extension 52 terminates in a solid portion 58 wherein there is provided an aperture 60. A conventional valve mechanism, generally indicated at 62, is detachably secured in the member 58 and a valve actuation handle 64 is associated therewith for the obvious purpose of selection in operation of the said valve. A conduit 66 is employed with the said valve mechanism for the purpose of conducting compressed air or other fluid into the said recess 60. Then, the fluid under pressure extends through a port 68 into a piston chamber 70. The piston 72, received therein, is reciprocated therein due to the force of the fluid under pressure. It will be noted that the said piston has a recess 74 therein while a spring loaded keeper 76 is provided in said bore. A tool shank 78 having a recess 80 adjacent the terminal portion thereof may be inserted in the said recess 74 and retained therein by engagement of the keeper 76 and the recess 80. The said piston chamber 70 is defined by the walls of a housing 82 having a detachable cap 84 at the bottom thereof and a plurality of apertures at the top.

Selected tools may be utilized in conjunction with this portion of the invention. Going to Figures 11, 12 and 21, there is disclosed cutter means employed in certain operations, preferably on metallic vehicle portions. The cutting means is preferably composed of a shank 86 terminating in one cutting edge member 88 and a second cutting edge member 90 associated therewith. The said second cutting edge member 90 is retained in the operative position relative to the cutting member 88 by utility of the bolt and nut construction disclosed in Figure 21 and indicated at 92. An enlargement 94 of the said shank 86 is provided with a plurality of prongs 96 extending therefrom. Also, air channels 98 extend as radii on the lower portion of the said enlargement 94. A central aperture 100 is provided in the said enlargement 94 for the purpose of receiving the head of a hammer 102 and piston 72 therein. Of course, this head 102 has the shank 78 along with the recess 80 therein, extending therefrom. The said hammer is received in the recess 74 as described above. Upon actuation of the tool retaining and actuation means, the cutters will obviously be motivated.

Going to Figure 13, there is another tool disclosed, somewhat similar to that disclosed in Figure 11, however, the terminal portion thereof has a chisel end 104 for the purpose of serving the usual functions associated with a chisel. It will be noted at this point that any type of conventional tool may be duplicated and provided with the pertinent features for utility with the present invention. Going to Figures 17 and 19, various types of punches, dollies and the like are disclosed. As mentioned above, this is but a few of the types and shapes of tool members which might be utilized herewith.

Going to Figure 2, there is disclosed a second embodiment of the invention, which embodiment differs from the first in obviating the extension means associated with the dolly retaining means. Each and every other member of this portion of the invention is the same, save the adjustable hammer retaining member, along with the serrations 46. Obviously, this embodiment of the invention is less versatile than the first, however, it is adequate and extremely useful in conjunction with certain straightening operations as well as certain material working conditions. It will be also noted that this embodiment of the invention may be utilized when expense of purchasing the tool is a material factor. It will be noted further that the sleeve 30 is attached directly to the yoke 110 of this embodiment of the invention. Further, when the extension member 52 is employed in a selected position of the embodiment described above, the said sleeve 52 may be fixed directly to the said yoke 10 of the first embodiment. It is noted further that the exhaust, resulting from the utility of compressed air, extends through suitable ports which are specially positioned for the purpose of forcing dirt and other foreign matter away from the operative working portion thereby adding life to the moving elements, due to the retaining of the moving parts clean, at and adjacent the bearing surfaces.

Going to the embodiment of the invention disclosed in Figure 3, it will be noted that the yoke 112 has the sleeve 30 fixed directly to one end thereof while the other end of the said yoke 112 has no bend therein. In other words, the yoke 112 may be considered substantially U-shaped.

It is here noted that in utility of various size punches (longer or shorter than that shown at 78), ring 36 may be lifted and a cotter pin or the like inserted in a selected aperture 35. This expedient thereby compensates for different length tools.

An extension 114 having a suitable aperture 116 therein is fixed to a selected terminal portion of the yoke 112 through utility of any suitable securing means such as the bolt and nut construction 118 disclosed in Figures 5 and 3. It is upon this extension means 114 that the valve mechanism 62 is detachably fixed and the housing 82 is likewise secured. Obviously, this embodiment of the invention may be employed under special working conditions and for special jobs. It is within the prerogative of the operator of the invention to select the most suitable embodiment of the invention for any particular job to be employed. Further, it will be noted that each and every one of the tools illustrated in the accompanying drawings as well as many others which are unillustrated, may be supplied for use in conjunction with each illustrated yoke.

While there has been described and illustrated but preferred embodiments of the present invention, it is apparent to those skilled in the art that various changes and rearrangements of elements may be made herein without departing from the spirit of the invention. Accordingly, limitation is sought only in accordance with the scope of the following claims.

Having thus described the invention, what is claimed as new is:

1. In a metal working tool, a yoke, means for retaining a dolly, means for detachably and extensibly securing said dolly retaining means to said yoke, hammer actuating and retaining means secured to said yoke, said retaining means including a lug extending from said yoke, a sleeve pivotally disposed on said lug, locking means for said sleeve, said locking means including an angular arm rotatably and concentrically disposed at one end on said lug and having the other end disposed in said sleeve, complementary serrated gripping surfaces on said arm and yoke, and a locking member associated with said sleeve and lug.

2. In a metal working tool, a yoke, means disposed at one end of said yoke to retain a dolly, and means for detachably securing said dolly retaining means to said yoke, hammer actuation and retaining means secured to the other end of said yoke, and said hammer actuation and retaining means including an angular arm, a lug secured to the end of said yoke opposite said dolly retaining means, said angular arm being hollow and having one end disposed rotatively on said lug, the confronting edges of said angular arm and said yoke having complemental gripping surfaces thereon to prevent rotation of said angular arm with respect to said lug, and means passed through said angular arm and disposed in said lug to retain said gripping surfaces against each other.

3. The combination of claim 2 and a sleeve disposed on one end of said angular arm and having said last-mentioned means passed therethrough to hold said sleeve on said angular arm.

ROBERT D. LITSTER.

REFERENCES CITED

The following references are of record in the file of this patent:

UNITED STATES PATENTS

| Number | Name | Date |
|---|---|---|
| 544,846 | Vincent | Feb. 18, 1896 |
| 1,798,379 | Kott | Mar. 31, 1931 |
| 1,982,667 | Hopkins | Dec. 4, 1934 |
| 2,332,050 | Borm | Oct. 19, 1943 |